(12) United States Patent
Chanda et al.

(10) Patent No.: US 10,554,484 B2
(45) Date of Patent: Feb. 4, 2020

(54) CONTROL PLANE INTEGRATION WITH HARDWARE SWITCHES

(71) Applicant: Nicira, Inc., Palo Alto, CA (US)

(72) Inventors: Anupam Chanda, San Jose, CA (US); Jianjun Shen, Beijing (CN); Hua Wang, Beijing (CN); Ziyou Wang, Beijing (CN); HsinYi Shen, San Jose, CA (US); Sarvani Vakkalanka, Cupertino, CA (US); Pankaj Thakkar, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 606 days.

(21) Appl. No.: 14/836,802

(22) Filed: Aug. 26, 2015

(65) Prior Publication Data

US 2016/0380812 A1    Dec. 29, 2016

Related U.S. Application Data

(60) Provisional application No. 62/185,430, filed on Jun. 26, 2015.

(51) Int. Cl.
*H04L 12/24* (2006.01)
*H04L 29/06* (2006.01)

(52) U.S. Cl.
CPC ...... *H04L 41/0803* (2013.01); *H04L 63/1458* (2013.01); *H04L 69/08* (2013.01); *H04L 69/18* (2013.01)

(58) Field of Classification Search
CPC ......... H04L 45/02; H04L 45/38; H04L 45/64; H04L 12/4633; H04L 45/16;
(Continued)

(56) References Cited

U.S. PATENT DOCUMENTS

| 5,526,484 A | 6/1996 | Casper et al. |
| 5,751,967 A | 5/1998 | Raab et al. |

(Continued)

FOREIGN PATENT DOCUMENTS

| EP | 1154601 | 11/2001 |
| EP | 1653688 A1 | 5/2006 |

(Continued)

OTHER PUBLICATIONS

Graubner et al., Energy-Efficient Virtual Machine Consolidation, Apr. 2013, all pages (Year: 2013).*

(Continued)

*Primary Examiner* — William G Trost, IV
*Assistant Examiner* — Imran Moorad
(74) *Attorney, Agent, or Firm* — Adeli LLP

(57) ABSTRACT

Some embodiments provide a managed hardware forwarding element (MHFE) controller that serves as an intermediary between one or more central controllers in a central control plane (CCP) cluster and one or more third-party hardware devices (e.g., physical switches and routers, appliances such as firewalls, load balancers, etc.). The MHFE controller of some embodiments uses (i) a first protocol to communicate with the CCP cluster and (ii) a second protocol to communicate with the one or more third-party devices managed by the MHFE controller, thereby enabling the CCP cluster to distribute logical network configuration information to the physical workloads (e.g., third-party servers connected to a third-party Top of Rack (TOR) switch).

20 Claims, 8 Drawing Sheets

(58) Field of Classification Search
CPC ... H04L 41/0853; H04L 41/12; H04L 45/021; H04L 45/42; H04L 45/60; H04L 45/54
See application file for complete search history.

(56) References Cited

U.S. PATENT DOCUMENTS

| | | |
|---|---|---|
| 6,243,394 B1 | 6/2001 | Deng |
| 6,640,251 B1 | 10/2003 | Wiget et al. |
| 6,850,529 B1 | 2/2005 | Wong |
| 7,463,639 B1 | 12/2008 | Rekhter |
| 7,937,438 B1 | 5/2011 | Miller et al. |
| 8,046,456 B1 | 10/2011 | Miller et al. |
| 8,161,095 B2 | 4/2012 | Manion et al. |
| 8,345,688 B2 | 1/2013 | Zhou et al. |
| 8,386,642 B2 | 2/2013 | Elzur |
| 8,589,919 B2 | 11/2013 | Smith et al. |
| 8,874,876 B2 | 10/2014 | Bhadra et al. |
| 8,897,134 B2 | 11/2014 | Kern et al. |
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1* | 9/2015 | Swierk ............... H04L 45/46 |
| 9,154,433 B2 | 10/2015 | Koponen et al. |
| 9,306,843 B2 | 4/2016 | Koponen et al. |
| 9,319,375 B2 | 4/2016 | Gross, IV et al. |
| 9,331,940 B2 | 5/2016 | Balus et al. |
| 9,369,426 B2 | 6/2016 | Koponen et al. |
| 9,397,946 B1* | 7/2016 | Yadav ............... H04L 41/0806 |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 | 9/2017 | Yadav et al. |
| 9,819,581 B2 | 11/2017 | Chanda et al. |
| 9,847,938 B2 | 12/2017 | Chanda et al. |
| 9,917,799 B2 | 3/2018 | Chanda |
| 9,923,815 B2 | 3/2018 | Assarpour et al. |
| 9,942,058 B2 | 4/2018 | Chanda et al. |
| 9,948,577 B2 | 4/2018 | Chanda |
| 9,967,182 B2 | 5/2018 | Chanda et al. |
| 9,979,593 B2 | 5/2018 | Chanda et al. |
| 9,992,112 B2 | 6/2018 | Chanda |
| 9,998,324 B2 | 6/2018 | Chanda et al. |
| 9,998,375 B2 | 6/2018 | Chanda |
| 10,153,965 B2 | 12/2018 | Davie et al. |
| 10,182,035 B2 | 1/2019 | Basler |
| 10,200,343 B2 | 2/2019 | Chanda et al. |
| 10,230,576 B2 | 3/2019 | Chanda et al. |
| 10,250,553 B2 | 4/2019 | Chanda et al. |
| 10,263,828 B2 | 4/2019 | Chanda et al. |
| 2002/0065919 A1 | 5/2002 | Taylor et al. |
| 2002/0093952 A1 | 7/2002 | Gonda |
| 2003/0041170 A1 | 2/2003 | Suzuki |
| 2003/0163645 A1 | 8/2003 | Tremblay et al. |
| 2004/0052216 A1 | 3/2004 | Roh |
| 2004/0267866 A1 | 12/2004 | Carollo et al. |
| 2005/0262132 A1 | 11/2005 | Morita et al. |
| 2006/0092940 A1 | 5/2006 | Ansari et al. |
| 2007/0028039 A1 | 2/2007 | Gupta et al. |
| 2008/0189769 A1 | 8/2008 | Casado et al. |
| 2008/0215586 A1 | 9/2008 | Pruet |
| 2009/0006603 A1 | 1/2009 | Duponchel et al. |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1 | 3/2011 | Li et al. |
| 2011/0090911 A1 | 4/2011 | Hao et al. |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0147898 A1 | 6/2012 | Koponen et al. |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1* | 2/2013 | Koponen ............... H04L 47/12 370/254 |
| 2013/0044641 A1* | 2/2013 | Koponen ............... H04L 12/66 370/255 |
| 2013/0051399 A1 | 2/2013 | Zhang et al. |
| 2013/0058208 A1* | 3/2013 | Pfaff ............... H04L 12/4633 370/217 |
| 2013/0058225 A1 | 3/2013 | Casado et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0060929 A1 | 3/2013 | Koponen et al. |
| 2013/0103818 A1 | 4/2013 | Koponen et al. |
| 2013/0114466 A1 | 5/2013 | Koponen et al. |
| 2013/0121209 A1 | 5/2013 | Padmanabhan et al. |
| 2013/0132533 A1 | 5/2013 | Padmanabhan et al. |
| 2013/0223454 A1 | 8/2013 | Dunbar et al. |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2013/0336134 A1 | 12/2013 | Bao et al. |
| 2014/0029451 A1 | 1/2014 | Nguyen |
| 2014/0029618 A1 | 1/2014 | Janardhanan |
| 2014/0071986 A1 | 3/2014 | Isobe |
| 2014/0101467 A1 | 4/2014 | Jubran et al. |
| 2014/0195666 A1 | 7/2014 | Dumitriu et al. |
| 2014/0201738 A1* | 7/2014 | Choi ............... G06F 9/45533 718/1 |
| 2014/0229605 A1 | 8/2014 | Besser et al. |
| 2014/0269683 A1 | 9/2014 | Bhagavathiperumal et al. |
| 2014/0269709 A1 | 9/2014 | Benny et al. |
| 2014/0301391 A1 | 10/2014 | Krishnan et al. |
| 2015/0009992 A1 | 1/2015 | Zhang |
| 2015/0100560 A1 | 4/2015 | Davie et al. |
| 2015/0100675 A1 | 4/2015 | Davie et al. |
| 2015/0100704 A1* | 4/2015 | Davie ............... H04L 45/16 709/238 |
| 2015/0103838 A1* | 4/2015 | Zhang ............... H04L 45/04 370/401 |
| 2015/0124586 A1 | 5/2015 | Pani |
| 2015/0124809 A1 | 5/2015 | Edsall et al. |
| 2015/0124821 A1 | 5/2015 | Chu et al. |
| 2015/0195178 A1 | 7/2015 | Bhattacharya et al. |
| 2015/0215189 A1 | 7/2015 | Lim |
| 2015/0281075 A1 | 10/2015 | Park et al. |
| 2015/0326425 A1 | 11/2015 | Natarajan et al. |
| 2015/0372906 A1 | 12/2015 | Tirat |
| 2015/0379150 A1 | 12/2015 | Duda |
| 2016/0014039 A1 | 1/2016 | Reddy et al. |
| 2016/0014073 A1 | 1/2016 | Reddy et al. |
| 2016/0173535 A1 | 6/2016 | Barabesh et al. |
| 2016/0197824 A1 | 7/2016 | Lin et al. |
| 2016/0212222 A1* | 7/2016 | Bultema ............... H04L 41/0813 |
| 2016/0232019 A1 | 8/2016 | Shah et al. |
| 2016/0308690 A1 | 10/2016 | Chanda et al. |
| 2016/0352633 A1 | 12/2016 | Kapadia et al. |
| 2017/0034002 A1 | 2/2017 | Sinn |
| 2017/0034051 A1 | 2/2017 | Chanda et al. |
| 2017/0034052 A1 | 2/2017 | Chanda et al. |
| 2017/0034053 A1 | 2/2017 | Chanda et al. |
| 2017/0063608 A1 | 3/2017 | Wang et al. |
| 2017/0085502 A1 | 3/2017 | Biruduraju |
| 2017/0093617 A1 | 3/2017 | Chanda et al. |
| 2017/0093618 A1 | 3/2017 | Chanda et al. |
| 2017/0093636 A1 | 3/2017 | Chanda et al. |
| 2017/0093646 A1 | 3/2017 | Chanda et al. |
| 2017/0093686 A1 | 3/2017 | Uttaro et al. |
| 2017/0093758 A1 | 3/2017 | Chanda |
| 2017/0126615 A1 | 5/2017 | Chanda et al. |
| 2017/0171055 A1 | 6/2017 | Wang et al. |
| 2017/0171077 A1 | 6/2017 | Chanda |

(56) References Cited

U.S. PATENT DOCUMENTS

| | | | |
|---|---|---|---|
| 2017/0171078 A1 | 6/2017 | Chanda |
| 2017/0171113 A1 | 6/2017 | Chanda |
| 2017/0208097 A1 | 7/2017 | Kirby et al. |
| 2017/0272316 A1 | 9/2017 | Johnson et al. |
| 2017/0317928 A1 | 11/2017 | Gude et al. |
| 2017/0366446 A1 | 12/2017 | Davie et al. |
| 2018/0007004 A1 | 1/2018 | Basler |
| 2018/0007005 A1 | 1/2018 | Chanda et al. |
| 2018/0026895 A1 | 1/2018 | Wang et al. |
| 2018/0183730 A1 | 6/2018 | Chanda |
| 2018/0219699 A1 | 8/2018 | Chanda et al. |
| 2018/0241622 A1 | 8/2018 | Chanda et al. |
| 2018/0241672 A1 | 8/2018 | Chanda et al. |
| 2018/0248796 A1 | 8/2018 | Chanda et al. |
| 2019/0089622 A1 | 3/2019 | Davie et al. |
| 2019/0141011 A1 | 5/2019 | Basler |

FOREIGN PATENT DOCUMENTS

| | | |
|---|---|---|
| JP | 2003069609 | 3/2003 |
| WO | 2005112390 A1 | 11/2005 |
| WO | 2008095010 A1 | 8/2008 |

OTHER PUBLICATIONS

Pfaff, Ben, et al., "The Open vSwitch Database Management Protocol," draft-pfaff-ovsdb-proto-00, Aug. 20, 2012, 34 pages, available at http:tools.ietf.orghtmldraft-pfaff-ovsdb-proto-00.

\* cited by examiner

CONTROL PLANE INTEGRATION WITH HARDWARE SWITCHES

BACKGROUND

There is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. A virtual network that is implemented for a tenant of a hosting system is a good example of a SDN networking. The virtual (logical) network of a tenant of the hosting system connects a set of virtual machines that are assigned to the tenant, to each other and to other virtual and/or physical networks.

One of the challenges in today's hosting system networks is extending the virtual networks (e.g., of one or more tenants) to other physical networks through physical switches (e.g., third party switches). One solution involves employing a specific type of switch to connect to the other physical networks, and having this switch serve as an L2 gateway. However, such a switch can become a bottleneck, and will have less throughput than dedicated hardware. Having the central network controller communicate directly with the third party switches requires the central controller to understand the different protocols required, and leaves the central controller subject to malicious network attacks such as Denial of Service (DoS) and Distributed DoS (DDoS) attacks from the third party switching devices.

BRIEF SUMMARY

Some embodiments provide a managed hardware forwarding element (MHFE) controller that serves as an intermediary between one or more central controllers in a central control plane (CCP) cluster and one or more third-party hardware devices (e.g., physical switches and routers, appliances such as firewalls, load balancers, etc.). The MHFE controller of some embodiments uses (i) a first protocol to communicate with the CCP cluster and (ii) a second protocol to communicate with the one or more third-party devices managed by the MHFE controller, thereby enabling the CCP cluster to distribute logical network configuration information to the physical workloads (e.g., third-party servers connected to a third-party Top of Rack (TOR) switch).

The CCP cluster of some embodiments configures and manages one or more logical networks for one or more tenants of a hosting system (e.g., a datacenter). In some embodiments, a logical network of the hosting system logically connects different end machines (e.g., virtual machines, physical servers, containers, etc.), through a set of logical forwarding elements. Some of the end machines (e.g., the virtual machines, containers, etc.) reside on host machines that execute managed software forwarding elements (MSFE), which implement the logical forwarding elements of the logical network to which the local end machines are logically connected. In other words, each of these host machines executes an MSFE that processes packets sent to and received from the end machines residing on the host machine, and exchanges these packets with other MSFEs operating on other host machines (e.g., through tunnels). The MSFE of some embodiments is a software instance that is implemented in the virtualization software (e.g., a hypervisor) of the host machine.

In order to configure and manage a logical network, the CCP cluster distributes logical forwarding data (e.g., forwarding tables) for a set of logical forwarding elements to be implemented by the MSFE on a host machine to a local controller plane (LCP) agent (also referred to as a local controller) that operates on the host machine. The local controller of some embodiments is also implemented in the virtualization software of the host machine. The local controller of the host machine then converts the logical forwarding data that it receives from the central controller to physical forwarding data, which can be recognized and used by the MSFE operating on the host machine to implement the set of logical forwarding elements.

In some embodiments, the CCP cluster communicates with the LCP agents using a proprietary protocol (e.g., the NETCPA protocol) to distribute the logical forwarding data to the LCP agent. The CCP cluster of some such embodiments also communicates to the MHFE controller using the same proprietary protocol to distribute such logical forwarding data to the MHFE controller.

The MHFE controller of some embodiments, however, communicates with the physical forwarding elements using a different protocol that the physical forwarding elements (e.g., third-party TOR switches) can recognize. This protocol in some embodiments is an open source protocol (e.g., an open vSwitch database management protocol (OVSDB), a border gateway protocol (BGP), etc.), which requires minimal software to run on the physical forwarding element to enable the forwarding element to communicate with the MHFE controller. In other words, the MHFE controller of some embodiments receives a set of logical forwarding data through the proprietary protocol and translates this data to a set of instructions in an open source protocol (OVSDB) which is recognizable by the third-party devices (e.g., TOR switches) that the MHFE manages, thereby enabling the CCP cluster to configure the third-party devices to implement the logical network or networks.

As stated above, the CCP cluster of some embodiments includes several central controllers. Each of these central controllers may be a process operating on a physical computing device (e.g., a controller server, a controller computer, etc.) or on a data compute node such as a virtual machine or container. In some embodiments, the MHFE controller is a separate software instance (or process) instantiated in the same physical computing device or data compute node in which a central controller of the CCP cluster runs, while in other embodiments, the MHFE controller instead operates on a separate physical computing device or data compute node.

By separating the MHFE controller from the CCP cluster, the CCP cluster remains agnostic to the platforms of the third-party devices. That is, the CCP cluster only needs to communicate with the MHFE controller through the same protocol (e.g., NETCPA) with which it communicates with other local controllers that manage the MSFEs. The MHFE controller is then responsible for translation of the forwarding tables to an open source protocol (e.g., OVSDB) that is recognizable by the third-party devices, and thus the MHFEs can be modified as needed for different third-party devices, without affecting the CCP cluster.

Separating the MHFE controller from the CCP cluster also allows for fault isolation. For instance, when the MHFE controller is separated from the CCP cluster, a faulty or malicious third-party device will not be able to adversely impact the CCP cluster. That is, the maximum impact of a denial of service (DoS) or a distributed denial of service (DDoS) attack could be the disablement of the MHFE controller rather than taking down one or more central controllers of the CCP cluster, or in the worst-case scenario, the whole CCP cluster. When a third-party device maliciously generates an excessive number of transactions, the CCP cluster is protected because the MHFE controller is the only controller affected by those transactions.

In some embodiments, each third-party device that receives logical data from the CCP cluster is assigned a master MHFE controller, which acts as the intermediary to receive the logical forwarding data in the first protocol and convert the data to the second protocol for the third-party device. In addition, each third-party device is assigned a backup MHFE controller, which takes over as the master for the third-party device in case the master MHFE controller goes down. In some embodiments, an MHFE controller may serve as the master controller for a first set of third-party devices and a backup controller for a second set of third-party devices.

The MHFE controller for a particular third-party device may receive logical forwarding data for the particular third-party device from multiple central controllers of the CCP cluster. Some embodiments shard the responsibility for computing and generating the logical forwarding data across multiple central controllers in the CCP cluster, with each central controller being responsible for a particular set of logical forwarding elements (e.g., logical routers, logical switches, etc.). Thus, if a particular third-party device implements logical forwarding elements managed by different central controllers, its master MHFE controller will receive data from these different central controllers.

This setup, with sharding the physical management responsibilities across the MHFEs and sharding the logical responsibilities across the central controllers, allows for easy scalability in some embodiments. That is, new third-party devices could be added to implement the logical networks by simply adding one or more new MHFE controllers for the new third-party devices to efficiently handle the new workload.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a managed hardware forwarding element (MHFE) controller that serves as an intermediary between one or more central controllers in a central control plane (CCP) cluster and one or more third-party hardware devices (e.g., physical switches and routers, applicances such as firewalls, load balancers, etc.). The MHFE controller of some embodiments uses (i) a first protocol to communicate with the CCP cluster and (ii) a second protocol to communicate with the one or more third-party devices managed by the MHFE controller, thereby enabling the CCP cluster to distribute logical network configuration information to the physical workloads (e.g., third-party servers connected to a third-party Top of Rack (TOR) switch).

The CCP cluster of some embodiments configures and manages one or more logical networks for one or more tenants of a hosting system (e.g., a datacenter). In some embodiments, a logical network of the hosting system logically connects different end machines (e.g., virtual machines, physical servers, containers, etc.), through a set of logical forwarding elements. Some of the end machines (e.g., the virtual machines, containers, etc.) reside on host machines that execute managed software forwarding elements (MSFE), which implement the logical forwarding elements of the logical network to which the local end machines are logically connected. In other words, each of these host machines executes an MSFE that processes packets sent to and received from the end machines residing on the host machine, and exchanges these packets with other MSFEs operating on other host machines (e.g., through tunnels). The MSFE of some embodiments is a software instance that is implemented in the virtualization software (e.g., a hypervisor) of the host machine.

In order to configure and manage a logical network, the CCP cluster distributes logical forwarding data (e.g., forwarding tables) for a set of logical forwarding elements to be implemented by the MSFE on a host machine to a local controller plane (LCP) agent (also referred to as a local controller) that operates on the host machine. The local controller of some embodiments is also implemented in the virtualization software of the host machine. The local controller of the host machine then converts the logical forwarding data that it receives from the central controller to physical forwarding data, which can be recognized and used by the MSFE operating on the host machine to implement the set of logical forwarding elements.

Figure 1:
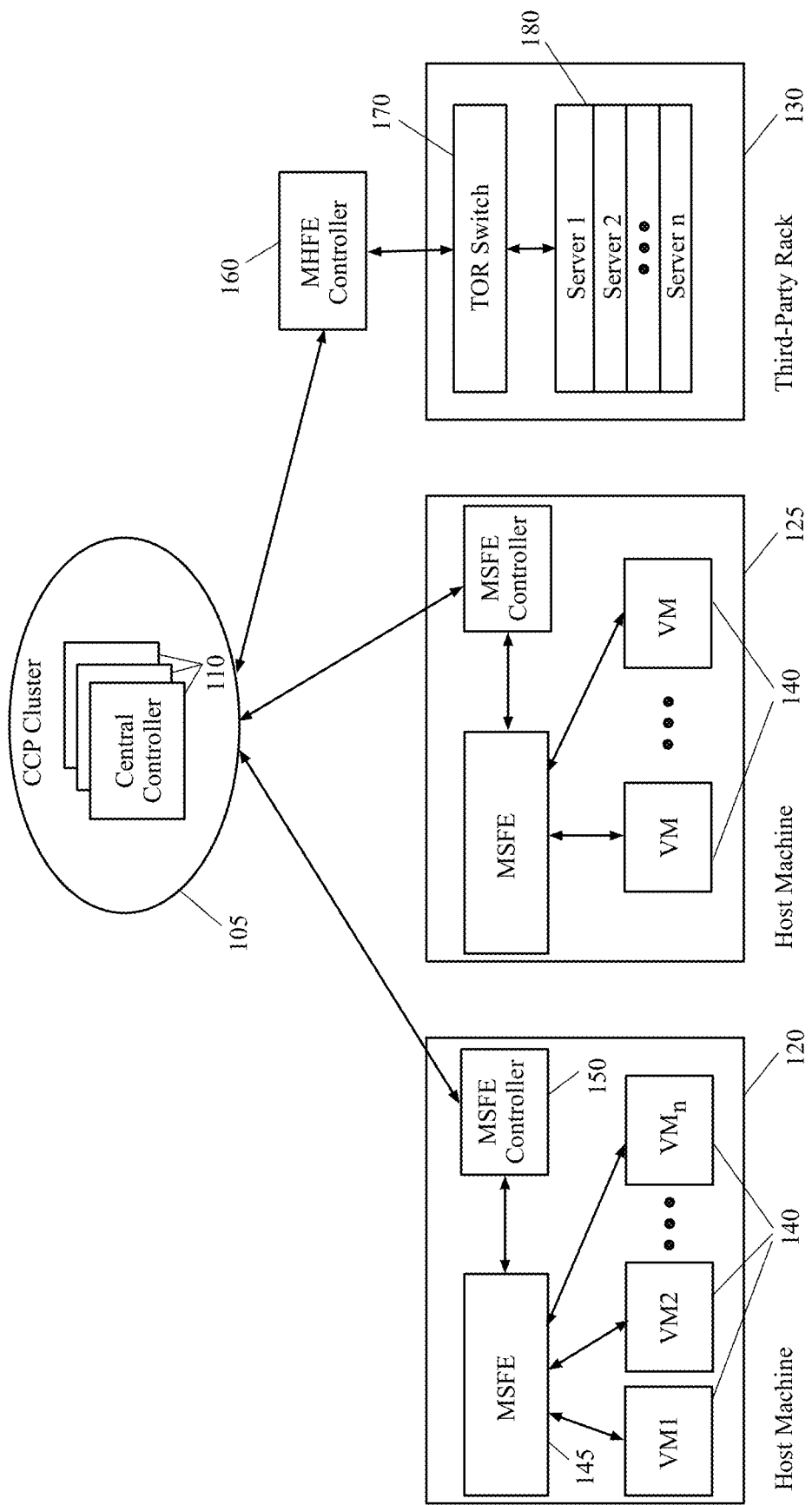
FIG. 1 illustrates a central control plane (CCP) cluster of some embodiments that configures and manages both software forwarding elements and hardware forwarding elements.

FIG. 1 illustrates a central control plane (CCP) cluster of some embodiments that configures and manages both software forwarding elements and hardware forwarding elements (e.g., to configure these software and hardware forwarding elements to implement one or more logical networks). This figure shows a CCP cluster 105, a first host machine 120, a second host machine 125, and a third-party rack 130. Each host machine shown in the figure includes a managed software forwarding element (MSFE) 145, a local MSFE controller 150 and a set of compute nodes (e.g., end machines) 140 (in this example, virtual machines). As stated above, in some embodiments the MSFE 145 and the MSFE controller are implemented in the virtualization software of the host machine.

Additionally, the third-party rack 130 shown in the figure includes a Top of Rack (TOR) switch 170, and a set of servers 180 that are connected to the TOR switch 170. The end machines 140 and servers 180 communicate with each other and other entities via one or more logical networks, to which they are connected by the MSFEs 145 and TOR switch 170, respectively.

The CCP cluster 105 communicates with the MSFEs 145 on the first and second host machines 120 and 125 through MSFE controllers 150 in order to implement and manage the logical networks that logically connect different sets of end machines operating on the first host machine 120 to different sets of end machines that operate on the second host machine 125. The CCP cluster 105 also communicates with the TOR switch 170 of the third-party rack 130 through the MHFE controller 160 in order to implement the logical networks on the TOR switch 170 and connect one or more of the servers 180 to the end machines connected to the logical networks.

One of ordinary skill in the art would realize that the number of the host machines, third-party racks, and TOR switches illustrated in the figure are exemplary and a logical network for a tenant of a hosting system may span a multitude of host machines and third-party devices, and logically connect a large number of end machines to each other and to several other third-party devices. Also, one of ordinary skill in the art would realize that even though the machines that are connected to TOR switch in this example are servers in a third-party rack, any other third-party device (e.g., computer, printer, etc.) could be connected to the logical networks through the TOR switch.

In some embodiments, the MSFE controller 150 of each host machine receives logical forwarding data to convert and pass to its local MSFE 145 from a central controller 110 of the controller cluster 105 in order to implement a set of logical forwarding elements (LFEs) in a logical network that is assigned to a tenant. The set of logical forwarding elements (not shown) logically connects one or more of the end machines that reside on the same host machine on which the MSFE operates. The logically connected end machines of the host machine, together with other logically connected end machines of other host machines (as well as end machines implemented as physical machines such as servers 180) create a logical network topology for the tenant of the hosting system. Before continuing the description of FIG. 1 and in order to better understand the logical network concept, the implementation of a logical network through a set of logical forwarding elements that span multiple MSFEs and a managed hardware forwarding element (MHFE) is described in more detail below by reference to FIG. 2.

Figure 2:
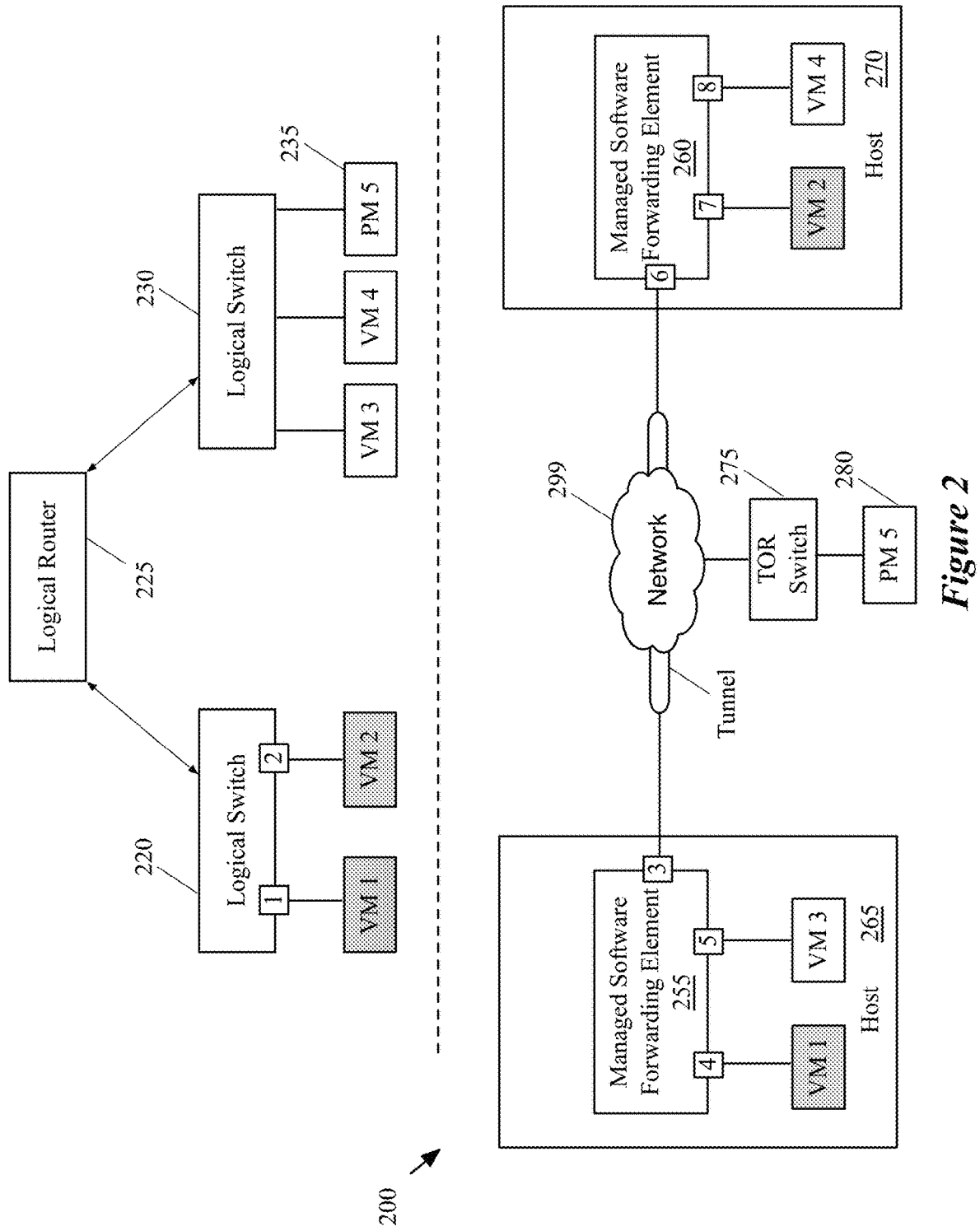
FIG. 2 conceptually illustrates an example of a virtual network that logically connects a set of end machines to a physical machine.

FIG. 2 conceptually illustrates an example of a virtual (logical) network that logically connects a set of end machines to a physical machine. More specifically, this figure illustrates a network architecture 200 of some embodiments, which implements a logical network including three logical forwarding elements (a logical router 225 and two logical switches 220 and 230). Specifically, the network architecture 200 represents a physical network that effectuates a logical network, the data packets of which are logically switched and/or routed by the logical router 225 and the logical forwarding elements 220 and 230. The top half of the figure illustrates the logical router 225 and the logical switches 220 and 230. The bottom half of the figure illustrates the physical network 200 that implements this logical network, including managed software forwarding elements 255 and 260. The figure also illustrates five end machines that attach to the logical network, including four virtual machines VM1-VM4 and one physical machine PM5.

In this example, VM1 and VM2 logically couple to the first logical switch 220, while VM3, VM4, and PM5 logically couple to the second logical switch 230. Both of the logical switches logically couple to the logical router 225. The connections of the end machines to the logical switches as well as the connections of the logical switches to the logical router are defined using logical ports, which are mapped to the physical ports of the MSFEs 255 and 260 and of the TOR switch 275.

In some embodiments, the logical routers and switches of a virtual network are implemented by each MSFE of the managed virtual network. That is, in some such embodiments, when the MSFE receives a packet from a VM that is coupled to the MSFE, it performs the processing for the logical switch to which that VM logically couples, as well as the processing for any additional logical forwarding elements (e.g., logical router processing if the packet is sent to an external network, logical router processing and processing for the other logical switch in the network if the packet is sent to an end machine coupled to the other logical switch, etc.).

In some embodiments, the MSFEs 255 and 260 implement the LFEs 220-230 through a set of flow entries. These flow entries are generated by a local controller operating on each host machine (e.g., the local controller 150 of FIG. 1). The local controller of each host machine generates the flow entries by receiving the logical forwarding data from the CCP cluster and converting the logical forwarding data to the flow entries for routing the packets of the logical network in the host machine. That is, the local controller converts the logical forwarding data to a customized set of forwarding behaviors that is recognizable and used by the MSFE to forward the packets of the logical network between the end machines operating on the host machine. In other words, by using the generated flow entries, the managed switching elements 255 and 260 are able to forward and route packets between network elements of the logical network that are coupled to the MSFEs 255 and 260.

In some embodiments, however, some or all of the MSFEs are not flow-based software forwarding elements, but instead process packets based on configuration data that is generated by their respective local controllers. In some embodiments, the local controllers receive the same data from the CCP cluster irrespective of the type of MSFEs they manage, and perform different data conversions for different types of MSFEs.

Additionally, the CCP cluster distributes the logical forwarding data to implement the logical switch 230 and logical router 225 to the TOR switch 280 in order for the TOR switch to implement these logical forwarding elements and connect the physical machine 235 to the virtual machines VM1-VM4. As described above, the CCP cluster of some embodiments does so by distributing the logical forwarding data to an MHFE through a first protocol to be subsequently distributed to the TOR switch through a second, different protocol.

As shown in this example, each of the MSFEs 255 and 260 has three ports through which the MSFE sends and receives data packets. For instance, in some embodiments the VMs couple to the MSFEs through virtual network interface cards (VNICs). In some embodiments, the data packets of the logical network travel through a tunnel that is established between the MSFEs 255 and 260, and the TOR switch (e.g., a tunnel between port 3 of the MSFE 295 and port 6 of the MSFE 260). Establishing tunnels that extend the virtual network overlay among MSFEs and other physical switches is described in more detail below by reference to FIG. 4.

In this example, each of the hosts 265 and 270 includes a managed switching element and several end machines as shown. The end machines VM1-VM4 are virtual machines that are each assigned a set of network addresses (e.g., a MAC address for L2 layer, an IP address for network L3 layer, etc.) and can send and receive network data to and from other network elements. The end machines are managed by virtualization softwares (not shown) that run on the hosts 265 and 270. The end machines VM1 and VM2 couple to the logical switch 220 through logical ports 1 and 2, respectively, of that logical switch. However, as shown, the machine VM1 is associated with the port 4 of the managed switching element 255, while the machine VM2 is associated with the port 7 of the managed switching element 260. The logical ports 1 and 2 are therefore mapped to the ports 4 and 7 of two different MSFEs operating on two different host machines.

The illustrated example shows how a set of compute nodes (e.g., VM1-VM4) that are assigned to a particular tenant of a hosting system are logically connected through a set of logical switches and routers of a logical network to each other and to a physical machine PM5. The example also illustrates how these logical switches and elements are implemented across multiple MSFEs and MHFEs.

Even though, in the illustrated example, each MSFE implements a set of logical forwarding elements for the same logical network, because a particular host machine of some embodiments may host virtual machines of more than one logical network (e.g., belonging to different tenants), the MSFE running on such a host machine may similarly implement logical forwarding elements for different logical networks.

Returning to FIG. 1, as shown, the CCP cluster 105 also communicates to the MFHE controller 160 in order to push the logical forwarding data to the TOR switch 170 and extend the logical networks to the set of servers that are connected to the TOR switch. As stated above, although in the illustrated example a set of servers are connected to the TOR switch, any other physical device (e.g., a third-party computing device) may be connected to the logical networks through this TOR switch. Conversely, one of ordinary skill in the art would realize that, in some embodiments, the TOR switch itself can be replaced by any other third-party physical device (e.g., a firewall, a load balancer, etc.) that is capable of communication with the MHFE 160 through an open source protocol.

As discussed above, an MSFE controller that operates on a host machine receives the logical forwarding data of a logical network from the CCP cluster and generates the necessary flow entries (or other configuration data) for the MSFE of the host machine to implement one or more LFEs (e.g., logical L2 switches, logical L3 routers, etc.). However, a third-party hardware device does not necessarily have the required platform, operating system, or applications to run or execute a controller process similar to the MSFE controller 150. Hence, some embodiments provide an MHFE controller that configures and manages the TOR switch (or other third-party devices) in a similar fashion that the MSFE controller configures and manages the MSFE. That is the MHFE controller of some such embodiments receives the logical forwarding data from the CCP cluster through a first protocol (e.g., a proprietary protocol such as NETCPA) and translates the network data to instructions that are recognizable by the TOR switch in a second protocol (e.g., an open source protocol such as OVSDB).

After receiving the logical network configuration data from the MSFE and MHFE controllers 150 and 160, the MSFESs and the TOR switch establish tunnels (e.g., a Virtual Extensible LAN (VXLAN) tunnel, a Stateless Transport Tunneling (STT) tunnel, etc.) between themselves (e.g., a full mesh of tunnels between all of the configured forwarding elements that implement the logical network) in order to exchange the logical network packets between the endpoints that are coupled to the MSFEs and the TOR switch. As stated above, establishing tunnels between different forwarding elements of a logical network is described in more detail below by reference to FIG. 4.

As mentioned above, in some embodiments, the MHFE controller is a separate software process from the central controller of the CCP cluster. In different embodiments, an MHFE controller may operate on the same machine as one of the CCP controllers, or on a different machine. For example, in FIG. 1, the MHFE controller 160 operates on a separate machine (e.g., in a separate virtual machine, on a separate physical device, etc.).

Figure 3:
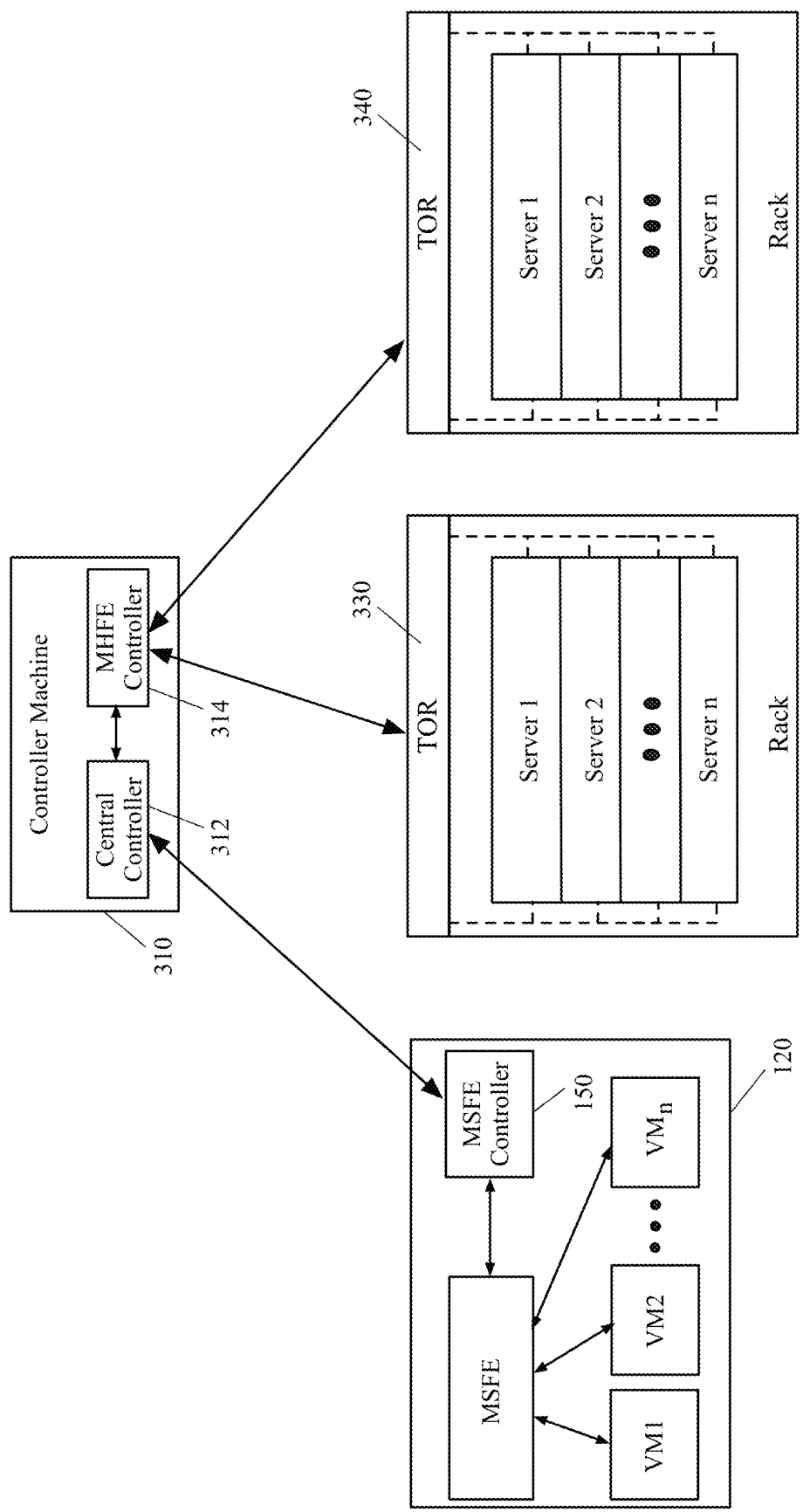
FIG. 3 illustrates an example of a managed hardware forwarding element (MHFE) controller of some embodiments that operates on the same physical machine on which, one of the central controllers of the CCP cluster operates, as a separate controller process.

FIG. 3, however, illustrates an example of a managed hardware forwarding element (MHFE) controller of some embodiments that operates on the same physical machine on which, one of the central controllers of the CCP cluster operates, as a separate controller process. Specifically, this figure shows a controller machine 310, on which both a central controller 312 and an MHFE controller 314 operate. The controller machine 310 may be a physical machine or a virtual machine that runs both of the controller processes, in different embodiments. The central controller 312 communicates with the MSFE controller 150 at the host machine 120 as well as the MHFE controller 314, as well as potentially other local MSFE controllers on other host machines and other MHFE controllers on other machines (which may or may not also operate on central controller machines).

The central controller 312 configures and manages a set of logical forwarding elements for different logical networks implemented in the hosting system (e.g., for different tenants of the hosting system). That is, the central controller 312 of some embodiments computes, generates, and distributes logical forwarding data for one or more logical networks that belong to one or more tenants of the hosting system. The central controller 312 can also configure and manage third-party hardware forwarding elements such as the third-party TOR switches 330 and 340 in order to extend one or more of the logical networks that this controller manages to the workloads on the TOR switches 330 and 340.

In some embodiments, the central controller process 310 computes and delivers the logical forwarding data (of a logical network) to the MHFE controller process 320 through a first proprietary protocol (e.g., NETCPA). The MHFE controller process 320 then translates this data in a second open source protocol (e.g., OVSDB) and delivers the translated data to the TOR switches 330 and 340. Using the logical forwarding data, the TOR switches are configured to process packets according to the logical forwarding tables of the logical forwarding elements managed by the central controller 312, and send these packets to other TOR switches and MSFEs via tunnels.

Figure 4:
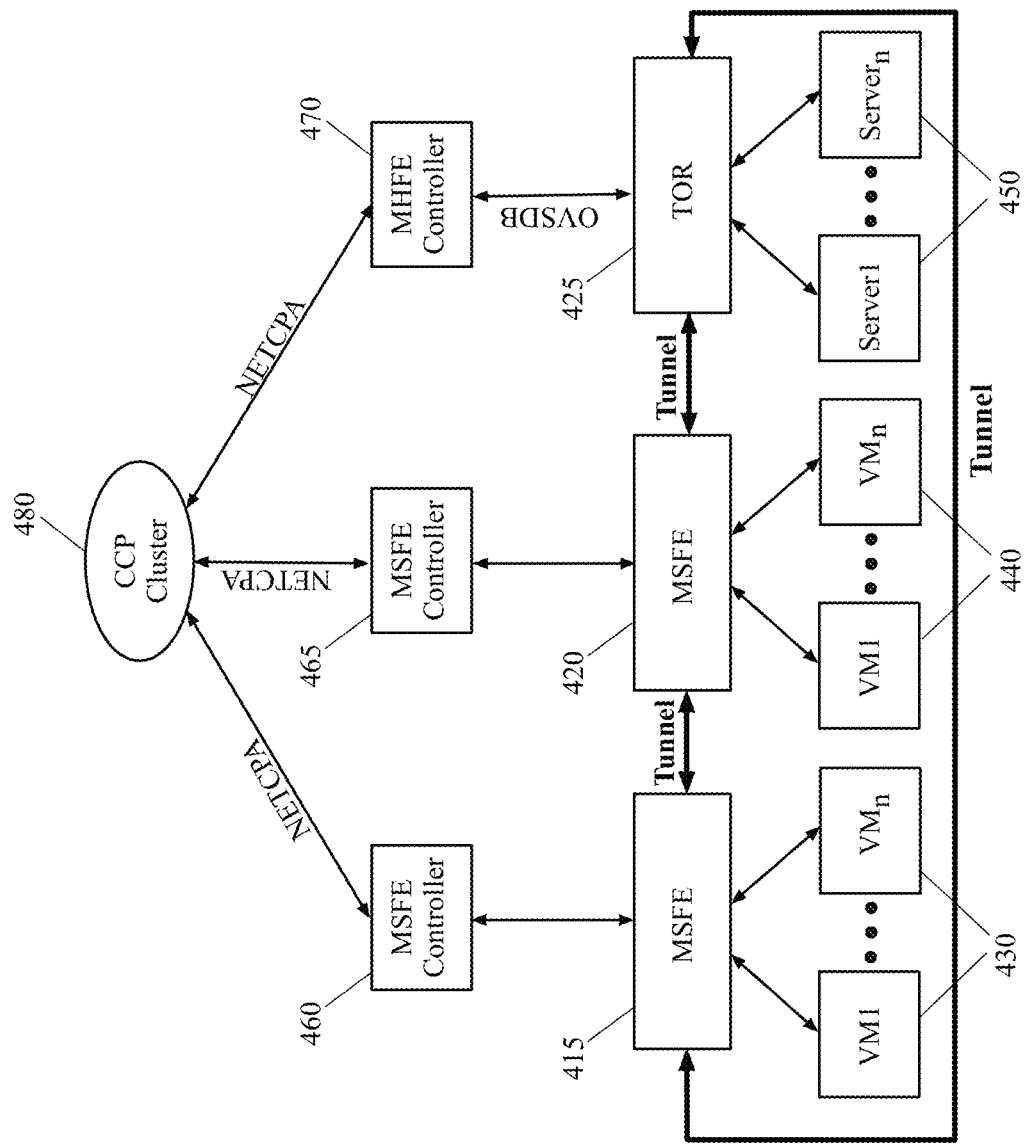
FIG. 4 illustrates an example of how the CCP cluster of some embodiments communicates with several forwarding elements (hardware and software) to implement one or more logical networks.

FIG. 4 illustrates an example of how the CCP cluster of some embodiments communicates with several forwarding elements (hardware and software) 415-425 to implement one or more logical networks. Specifically, this figure shows a CCP cluster 480 exchanging logical forwarding and configuration data with the forwarding elements to implement one or more logical forwarding elements and create tunnels between the various software and physical forwarding elements.

In some embodiments one or more controllers of the CCP cluster 480 manage and configure the MSFE 415 through the MSFE controller 460 (also referred to as a local control plane (LCP) agent) to implement one or more logical forwarding elements of the logical networks to which the virtual machines 430 connect. Similarly, the controllers of the CCP cluster 480 manage and configure the MSFE 420 through the MSFE controller 465 to implement one or more logical forwarding elements of the logical networks to which the virtual machines 440 connect. As described above, each pair of MSFE controller and MSFE of some embodiments operates on one host machine (e.g., in the virtualization software of the host machine). In addition, the controllers of the CCP cluster 480 manage and configure the TOR switch 425 through the MHFE controller 470 to implement one or more logical forwarding elements of the logical networks to which the servers 450 connect.

As shown, the controllers of the CCP cluster communicate with the MSFE controller agents using the NETCPA protocol, which is a proprietary protocol (a Virtual Extensible LAN (VXLAN) control plane protocol), in order to distribute the logical forwarding data to the MSFE controllers. The CCP cluster of some such embodiments also communicates to the MHFE controller using the same proprietary protocol to distribute the logical forwarding data to the MHFE controller. The MHFE controller then communicates with the MHFE using a different protocol. In some embodiments, the MSFE controller uses the OpenFlow protocol to distribute the converted forwarding tables to the MSFE (e.g., as a set of flow entries) and a database protocol (e.g., the OVSDB protocol) to manage the other configurations of the MSFEs, including the configuration of tunnels to other MSFEs. In some other embodiments the MSFE controller uses other protocols to distribute the forwarding and configuration data to the MSFEs (e.g., a single protocol for all of the data or different protocols for different data).

In the illustrated example, the CCP cluster 480 communicates with the MSFE controllers 460 and 465 using the NETCPA protocol. That is, the CCP cluster computes the logical forwarding data necessary for implementing the logical networks on the MSFEs 415 and 420. The CCP cluster then pushes the computed logical forwarding data down to the MSFE controllers 460 and 465 through the NETCPA protocol. Each of the MSFE controllers 460 and 465 then converts the logical forwarding data that it receives from the CCP cluster to physical forwarding data for its corresponding MSFE (i.e., the MSFE that resides on the same host machine that the MSFE controller does). The physical forwarding data includes (1) data (e.g., a table with physical flow entries) for the MSFE to implement the required set of logical forwarding elements for packets sent to and from the virtual machines that connect to the MSFE and (2) data to encapsulate these packets in tunnels in order to send the packets to other physical forwarding elements.

The logical data of some embodiments includes tables that map addresses to logical ports of logical forwarding elements (e.g., mapping MAC addresses of virtual machines or servers to logical ports of logical switches, mapping IP subnets to ports of logical routers, etc.), routing tables for logical routers, etc. In addition, the logical data includes mappings of the logical ports to physical locations (e.g., to MSFEs or MHFEs at which the machines connected to a logical port is located). In some embodiments, the MSFE controller converts this logical data into a set of flow entries that specify expressions to match against the header of a packet, and actions to take on the packet when a given expression is satisfied. Possible actions include modifying a packet, dropping a packet, sending it to a given egress port on the logical network, and writing in-memory metadata (analogous to registers on a physical switch) associated with the packet and resubmitting the packet back to the logical network for further processing. A flow expression can match against this metadata, in addition to the packet's header.

Different from the MSFE controllers, the MHFE controller of some embodiments communicates with the third-party device using a different protocol that the device (e.g., third-party TOR switch) can recognize. This protocol in some embodiments is an open source protocol (e.g., the OVSDB protocol used in some embodiments to configure certain aspects of the MSFEs), border gateway protocol (BGP), etc.), which requires minimal software to run on the third-party device to enable the device to communicate with the controller and implement the logical networks as needed. In other words, the MHFE controller of some embodiments receives a set of logical forwarding data through the proprietary protocol and translates this data to a set of instructions in an open source protocol (OVSDB) which is recognizable by the third-party devices (e.g., TOR switches) that the MHFE controller manages.

In the illustrated example, the CCP cluster 480 communicates with the MHFE controller 470 using the NETCPA protocol (the same way it communicates with the MSFE controllers 460 and 465). The MHFE controller, as shown, communicates with the MHFE (i.e., the TOR switch 425) using the OVSDB protocol. Through the OVSDB protocol, the MHFE controller 470 reads the configurations of the physical switch (e.g., an inventory of its physical ports) and sends the logical forwarding and configuration data to the physical switch. For example, the MHFE controller 470 sends instructions to the physical switch 425 through OVSDB protocol to implement the forwarding tables of the logical network. The physical switch 425 can then convert this data into its own format to be used to process packets received from and sent to the servers 450.

In some embodiments, the MHFE controller 470 communicates with the physical switch over the OVSDB protocol to exchange forwarding state (e.g., L2 and/or L3 forwarding state). For instance, the physical switch 425 might send an update notification to the CCP cluster (through the MHFE controller) regarding a learned MAC address of a machine (e.g., desktop computer, laptop) that is connected to its port. The CCP cluster can then compute the necessary logical data and push this logical data down to the MSFE controllers using the NETCPA protocol. The CCP cluster might also send to the physical switch 425, through the MHFE controller 470, the MAC addresses of the machines 430 and 440 that are coupled to the MSFEs 415 and 420. The physical switch 425 of some such embodiments then calculates its own forwarding data based on the forwarding information it receives from the CCP cluster. The method of computation of the forwarding data by a physical switch can vary from one switch vendor to another.

In some embodiments, the CCP cluster 480 also exchanges management data with the MSFE controllers and MHFE controllers using the NETCPA protocol. In some embodiments, the MSFE controller uses the same or different protocol to deliver the management data to the MSFEs. The management data of some embodiments includes instructions on how to set up tunnels between the MSFEs and MHFEs. For instance, each of the TOR switches serves as a tunnel endpoint in some embodiments, and receives addresses (e.g., IP addresses) of the other tunnel endpoints, as well as other information to use when encapsulating packets in the tunnels (e.g., logical network and logical port identifiers, etc.). The CCP cluster uses the NETCPA protocol to send this data to the MHFE controller in some embodiments, and the MHFE controller uses the OVSDB protocol to translate the data to instructions for the TOR switch to create a tunnel between itself and other switches (software and hardware) of the logical network.

Figure 5:
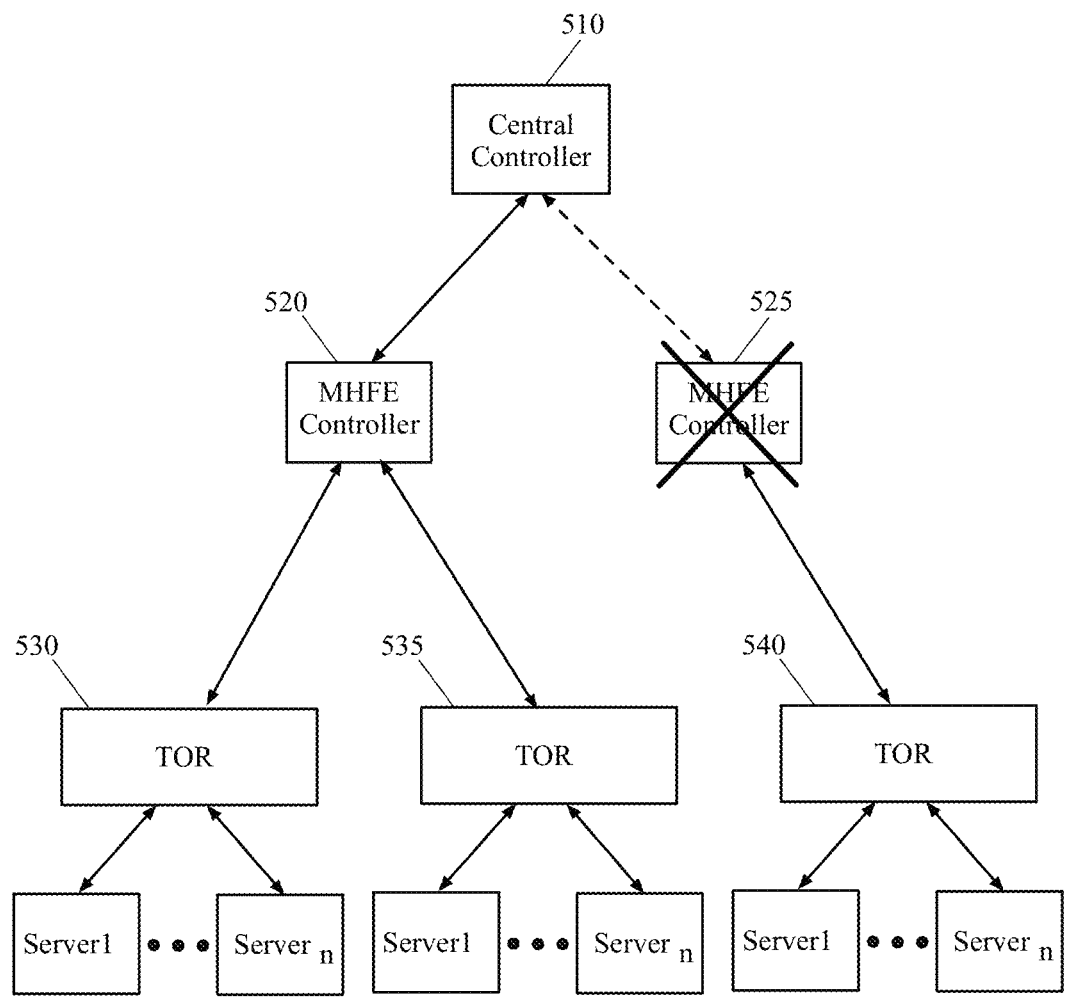
FIG. 5 illustrates an example of a managed hardware forwarding element (MHFE) controller of some embodiments that communicates with more than one MHFE in order to configure and manage the MHFEs for one or more logical networks.

FIG. 5 illustrates an example of a managed hardware forwarding element (MHFE) controller of some embodiments that communicates with more than one MHFE in order to configure and manage the MHFEs for one or more logical networks. The figure illustrates a central controller 510 of a CCP cluster that configures and manages three different third-party TOR switches 530-540 through the two MHFE controllers 520 and 525. Specifically, the central controller 510 communicates with MHFE controller 520 (e.g., through NETCPA protocol), in order to distribute the logical forwarding data to the MHFE controller, which in turn delivers the logical forwarding data to the TOR switches 530 and 535 (e.g., through OVSDB protocol). Similarly, the central controller 510 communicates with MHFE controller 525, in order to distribute the logical forwarding data to the MHFE controller, which in turn delivers the logical forwarding data to the TOR switch 540.

As described above, the MHFE controller of some embodiments is a separate controller process or machine from the central controller processes of machines of the CCP cluster. Separating the MHFE controller from the CCP cluster renders numerous benefits that result in improving the network's overall efficiency. One such benefit is that the CCP cluster remains agnostic to the platforms of the third-party devices. That is, the CCP cluster only needs to communicate with the MHFE controller through a same protocol (e.g., NETCPA) with which it communicates with other local controllers that manage the virtual network. The MHFE controller is then responsible for translation of the forwarding tables to an open source protocol (e.g., OVSDB) that is recognizable by the third-party devices. In this example, the TOR switch 540 might be a different type of switch than the TOR switches 530 and 535, necessitating different conversion operations by the MHFE controllers 520 and 525 in some embodiments.

Separating the MHFE controller from the CCP cluster also allows for fault isolation. For instance, when the MHFE controller is separated from the CCP cluster, a faulty or malicious third-party device will not be able to adversely impact the CCP cluster. That is, the maximum impact of a denial of service (DoS) or a distributed denial of service (DDoS) attack could be the disablement of the MHFE controller rather than taking down one or more central controllers of the CCP cluster, or in the worst-case scenario, the whole CCP cluster. When a third-party device maliciously generates an excessive number of transactions, the CCP cluster is protected because the MHFE controller is the only controller affected by those transactions.

In FIG. 5, the TOR switch 540 at some point during the communication with the MHFE 525 has started to generate a larger number of transactions than normal, which could be indicative of a malicious network attack such as a DoS or DDoS attack (or a different type of attack) against which the CCP cluster could be vulnerable. However, as illustrated in this figure, the central controller 510 is protected against such a network attack since it does not interact with the third-party switch directly. Instead, as shown, the MHFE controller 525 has been adversely affected and disabled. Therefore, not only is the CCP cluster is protected against the attack, but also the central controller that was communicating with the malicious hardware switch would not be harmed and would continue to be able to provide controller services to the other network elements such as the MHFE controller 520 without any interruption. As will be discussed in more detail below by reference to FIG. 7, in some embodiments, when an MHFE controller that is a master controller of a third-party device ceases to operate, a backup MHFE controller for that third-party device takes over the duties of the failed master MHFE controller.

Scalability is another benefit of separating the MHFE controller from the CCP cluster. That is, new third-party devices could be added to different virtual networks by simply adding one or more new MHFE controllers for the new third-party devices to efficiently handle the new workload. In some embodiments, the MHFE controller for a particular third-party device may receive logical forwarding data for the particular third-party device from multiple central controllers of the CCP cluster. Some embodiments shard the responsibility for computing and generating the logical forwarding data across multiple central controllers in the CCP cluster, with each central controller being responsible for a particular set of logical forwarding elements (e.g., logical routers, logical switches, etc.). Thus, if a particular third-party device implements logical forwarding elements managed by different central controllers, its master MHFE controller will receive data from these different central controllers.

This setup, with sharding the physical management responsibilities across the MHFEs and sharding the logical responsibilities across the central controllers, allows for easy scalability in some embodiments. That is, new third-party devices could be added to implement the logical networks by simply adding one or more new MHFE controllers for the new third-party devices to efficiently handle the new workload.

Figure 6:
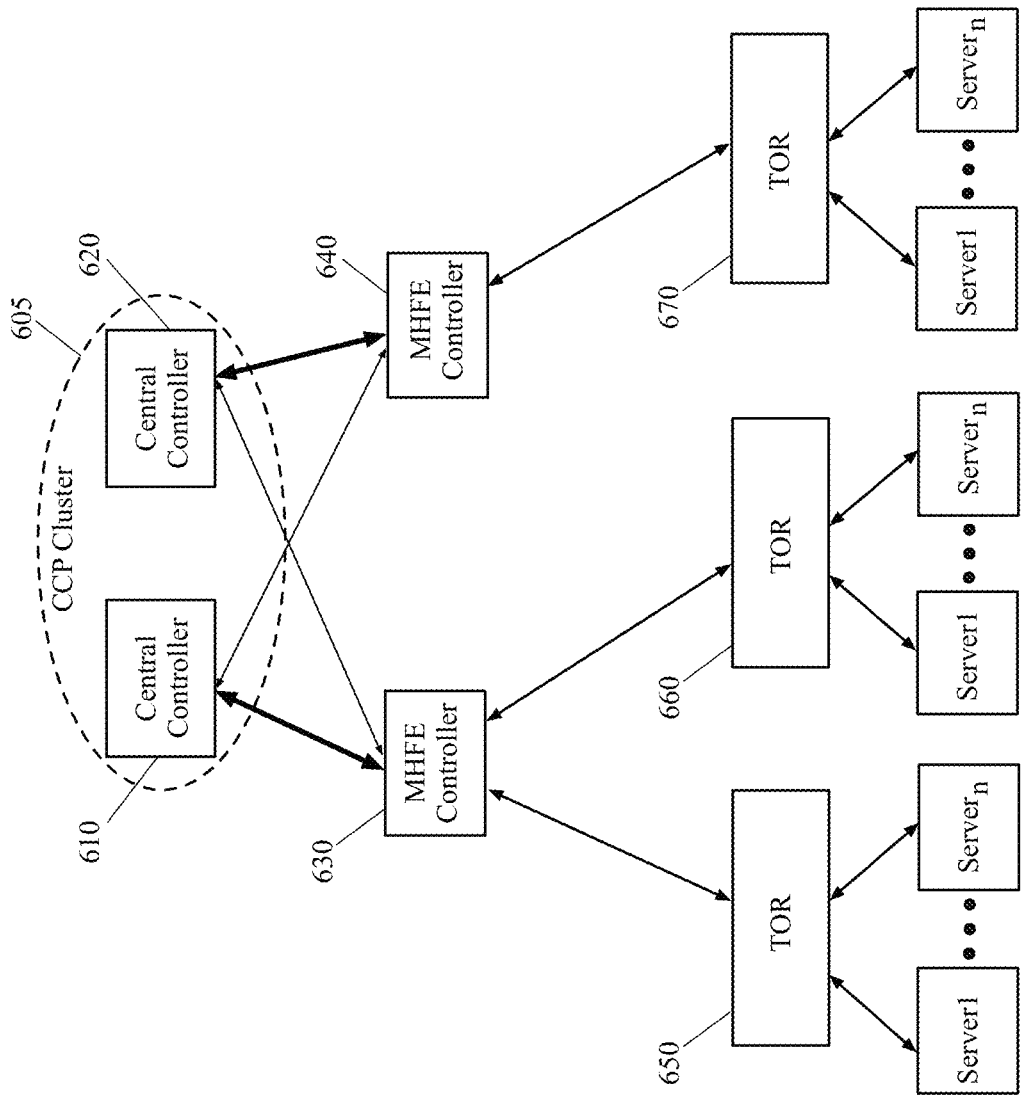
FIG. 6 illustrates different master MHFE controllers of some embodiments that are responsible for different sets of third-party devices.

FIG. 6 illustrates different master MHFE controllers of some embodiments that are responsible for different sets of third-party devices. Specifically, this figure shows that two central controllers 610 and 620 of the CCP cluster 605 communicate with two master MHFE controllers 630 and 640 in order to configure and manage the TOR switches 650-670 in one or more logical networks. The logical forwarding data for implementing different sets of logical forwarding elements on these TOR switches has been sharded between the two central controllers (e.g., during the configuration of the CCP cluster by a network administrator).

In the illustrated example, the central controller 610 is the primary central controller that communicates with the MHFE controller 630 for implementing a first set of LFEs on the TOR switches 650-670, while the central controller 620 is the primary central controller that communicates with the MHFE controller 640 for implementing a second set of LFEs on the TOR switches 650-670. The MHFE controller 630 is the master controller for the TOR switches 650 and 660, while the MHFE controller 640 is the master controller for the TOR switch 670.

The TOR switch 650 might implement several logical switches and logical routers (for one or more logical networks), some of which are managed by the central controller 610 and some of which are managed by the central controller 620. Similarly, the TOR switches 660 and 670 might also implement logical switches and routers (some of which are the same as those implemented by the TOR switch 650, and some of which might not be implemented by the TOR switch 650, depending on to which logical networks the machines that connect to the various TOR switches belong).

As an example, the TOR switch 650 might implement a first logical switch managed by the controller 610 and a second logical switch managed by the controller 620. In this case, the MHFE controller 630 receives logical data for implementing the first logical switch from the controller 610 and logical data for implementing the second logical switch from the controller 620. The MHFE then translates this data to a second protocol and distributes the translated data to the TOR switch 650 as described above.

Although in the illustrated example there are only two central controllers in the CCP cluster, each of which is a primary generator and distributor of logical forwarding data for a set of LFEs, one of ordinary skill in the art would realize that a CCP cluster can have many more central controllers across which the responsibilities for management of the logical forwarding elements are sharded. Additionally, one of ordinary skill in the art would realize that there can be many more third-party devices to which a master MHFE controller communicates and the illustrated few number of the master controllers and their corresponding MHFEs are only exemplary and for simplicity of the description.

As described above, in some embodiments, each third-party device that receives logical data from the CCP cluster is assigned a master MHFE controller, which acts as the intermediary to receive the logical forwarding data in the first protocol (e.g., NETCPA) and convert the data to the second protocol (e.g., OVSDB) for the third-party device. In addition, each third-party device is assigned a backup MHFE controller, which takes over as the master for the third-party device in case the master MHFE controller goes down. In some embodiments, an MHFE controller may serve as the master controller for a first set of third-party devices and a backup controller for a second set of third-party devices.

Figure 7:
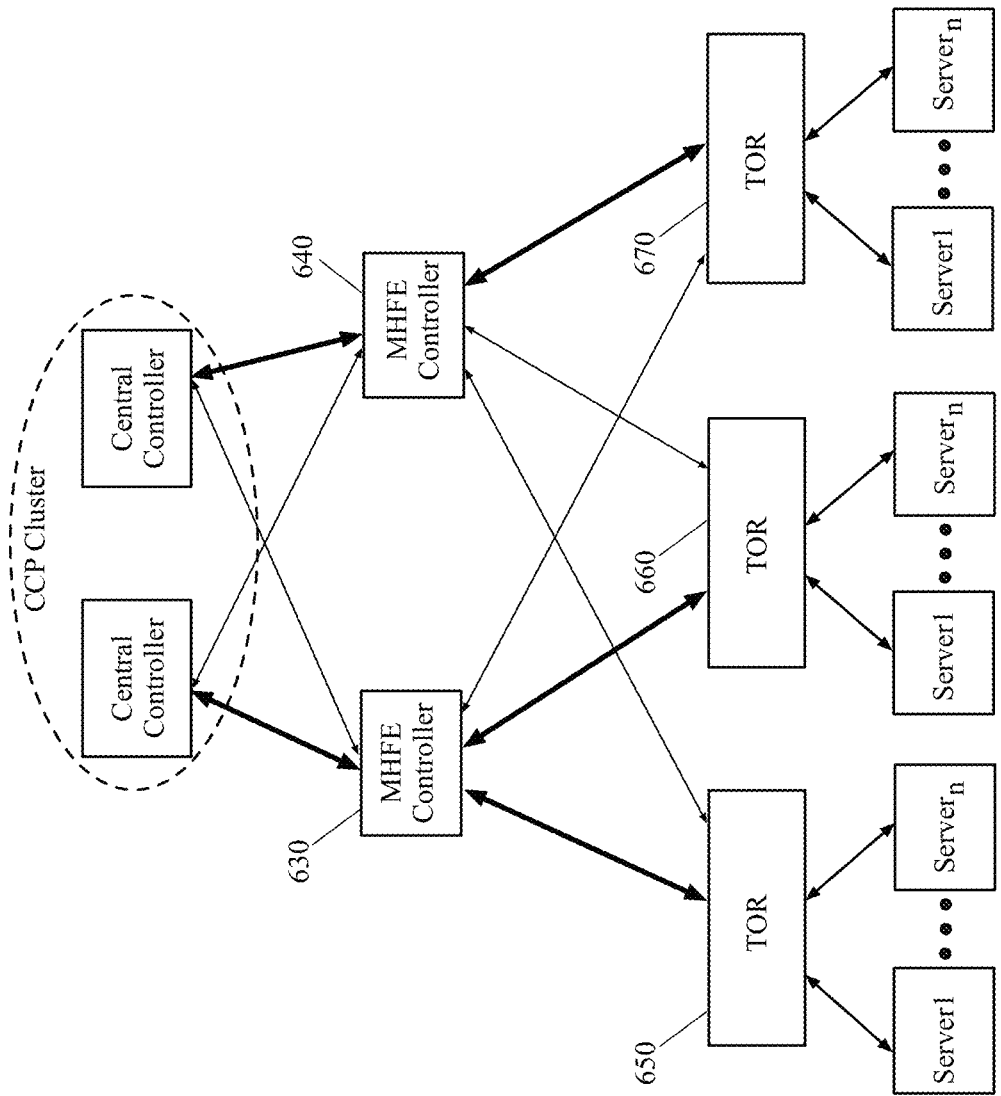
FIG. 7 illustrates the master-slave (or master-backup) relationships between two different MHFE controllers and three third-party TOR switches.

FIG. 7 illustrates the same network control system as FIG. 6, except that this figure additionally shows the master-slave (or master-backup) relationships between the two MHFE controllers 630-640 and the three third-party TOR switches 0650-670. More specifically, this figure shows that while the MHFE controller 630 is the master controller for the TOR switches 650 and 660, it also serves as the backup MHFE controller for the master controller 640. That is, the master MHFE controller 630 serves as a backup MHFE controller for the TOR switch 670 in case the master MHFE controller 640 ceases to operate for any reason.

Similarly, while the MHFE controller 640 is the master controller for the TOR switch 670, it also serves as the backup controller for the master controller 630. That is, the master MHFE controller 640 serves as a backup MHFE controller for the TOR switches 650 and 660, in case the master MHFE controller 630 ceases to operate. Again, one of ordinary skill in the art would realize that there can be many more third-party devices with which a master MHFE controller communicates and the illustrated master and slave controllers and their corresponding MHFEs are only exemplary. For instance, if a first MHFE controller is the backup for a second MHFE controller, the second MHFE controller might not be the backup for the first MHFE controller.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
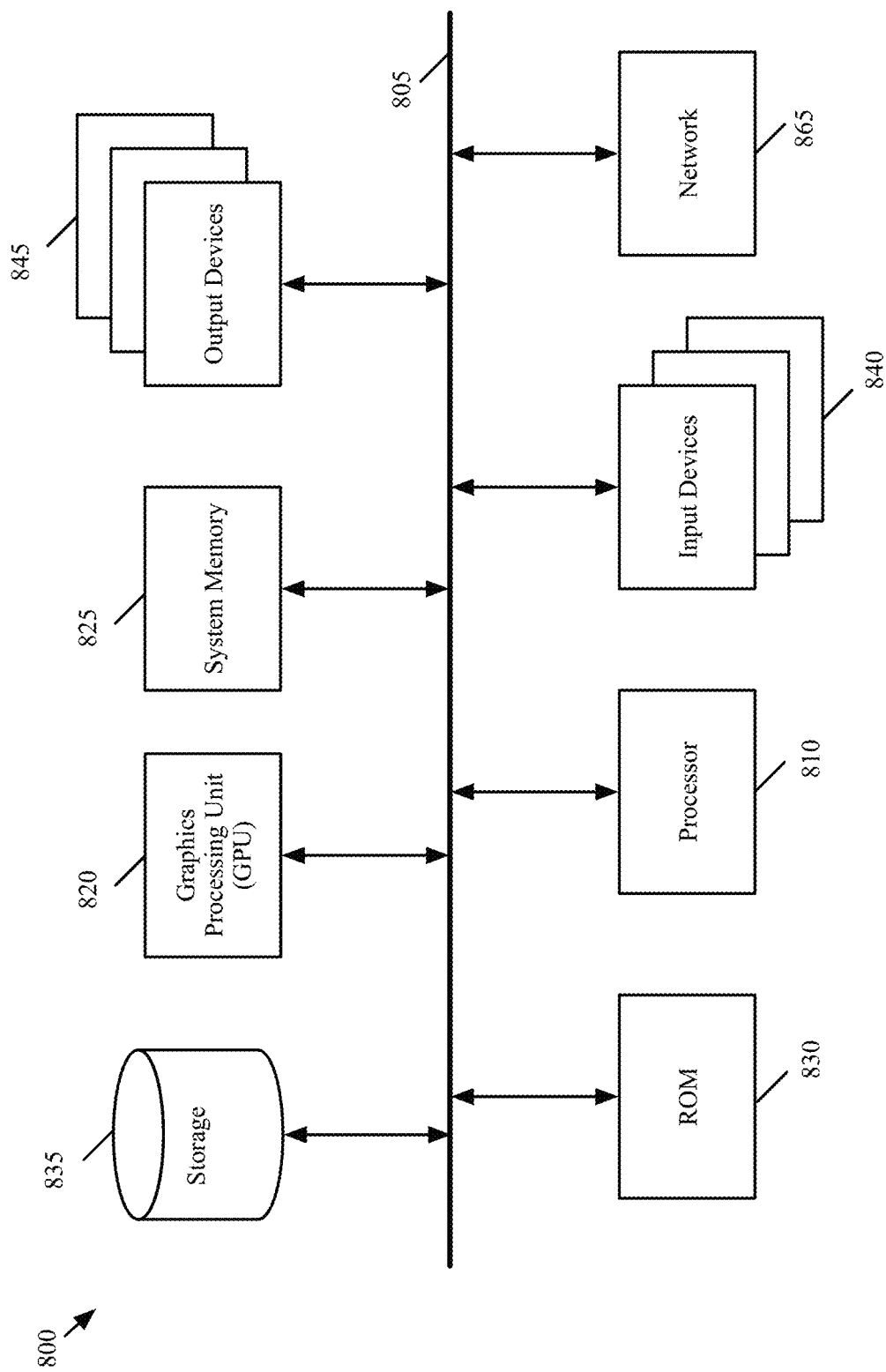
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for distributing configuration data for configuring managed software and hardware forwarding elements to implement a logical forwarding element, the method comprising:
    to a first local controller executing on a first computer along with a managed software forwarding element (MSFE), distributing using a first protocol through a network a first configuration data set, for the first local controller to configure the MSFE to implement the logical forwarding element; and
    to a second local controller executing on a second computer, distributing using the first protocol a second configuration data set, for the second local controller (i) to translate the second configuration data set into a third configuration data set using a second, different protocol and (ii) to use the second protocol to distribute the translated third configuration data set through the network to a managed hardware forwarding element (MHFE) to configure the MHFE to implement the logical forwarding element,
    the configured MSFE and MHFE forwarding a plurality of data messages through the network according to a set of logical forwarding rules of the logical forwarding element.

2. The method of claim 1, wherein a plurality of virtual machines execute on the first computer and connect to the MSFE.

3. The method of claim 2, wherein the first computer executes a virtual machine connected to the MSFE, wherein the virtual machine is logically connected to a physical machine that connects to the MHFE.

4. The method of claim 1, wherein the method is performed by a central controller instance that executes on the second computer.

5. The method of claim 4, wherein the central controller instance is one of a plurality of controllers that form a central control plane cluster that computes configuration data for managed forwarding elements to implement logical networks for a plurality of tenants of a hosting system.

6. The method of claim 1, wherein the method is performed by a central controller instance that executes on a third computer, wherein the second configuration data set is distributed to the second local controller through the network.

7. The method of claim 1, wherein the MHFE comprises a top of rack switch to which a plurality of physical machines connect.

8. The method of claim 1, wherein the MHFE is a first MHFE to which a plurality of physical machines connect, wherein the second local controller distributes through the network at least a subset of the third configuration data set to a second MHFE to implement the logical forwarding element, wherein the second MHFE forwards data messages according to the set of logical forwarding rules of the logical forwarding element.

9. The method of claim 1, wherein the third configuration data set comprises forwarding tables that specify forwarding behaviors of the logical forwarding element that is implemented by the MHFE and the MSFE.

10. The method of claim 9, wherein the third configuration data set further comprises configuration data that defines a set of tunnels between the MHFE and a set of MSFEs in order to forward the plurality of data messages.

11. The method of claim 1, wherein the first protocol used to distribute the first and second sets of configuration data is a proprietary protocol, wherein the second protocol used to distribute the third configuration data set is an open source protocol that is recognizable and used by the MHFE to implement the logical network.

12. A non-transitory machine readable medium storing a controller instance which when executed by at least one processing unit distributes configuration data for configuring managed software and hardware forwarding elements to implement a logical forwarding element, the controller instance comprising sets of instructions for:
    distributing using a first protocol through a network, to a first local controller executing on a first computer along with a managed software forwarding element (MSFE), a first configuration data set for the first local controller to configure the MSFE to implement the logical forwarding element; and
    distributing using the first protocol, to a second local controller executing on a second computer, a second configuration data set for the second local controller (i) to translate the second configuration data set into a third configuration data set using a second, different protocol and (ii) to use the second protocol to distribute the translated third configuration data set through the network to a managed hardware forwarding element (MHFE) to configure the MHFE to implement the logical forwarding element,
    the configured MSFE and MHFE forwarding a plurality of data messages through the network according to a set of logical forwarding rules of the logical forwarding element.

13. The non-transitory machine readable medium of claim 12, wherein a plurality of virtual machines execute on the first computer and connect to the MSFE.

14. The non-transitory machine readable medium of claim 12, wherein the controller instance is a first controller instance, the MHFE is a first MHFE, and the logical forwarding element is a first logical forwarding element, wherein the first controller instance further comprises a set of instructions for distributing, to a third local controller, a fourth configuration data set for the third local controller (i) to translate the fourth configuration data set into a fifth configuration data set using the second protocol and (ii) to use the second protocol to distribute the translated fifth configuration data set through the network to a second MHFE to implement a second logical forwarding element.

15. The non-transitory machine readable medium of claim 12, wherein the MHFE is one of a first set of MHFEs for which the second local controller is a master controller, wherein a third local controller is a master controller of a second set of MHFEs and a backup controller of the first set of MHFEs.

16. The non-transitory machine readable medium of claim 15, wherein the third local controller takes over management of the first set of MHFEs when the second local controller ceases to operate.

17. The non-transitory machine readable medium of claim 12, wherein the third configuration data set comprises (i) forwarding tables that specify forwarding behaviors of the logical forwarding element that is implemented by the MHFE and the MSFE, and (ii) configuration data that defines a set of tunnels between the MHFE and a set of MSFEs in order to forward the plurality of data messages.

18. The non-transitory machine readable medium of claim 12, wherein the MHFE is a third-party top of rack (TOR) switch, wherein the first protocol used to distribute the first and second sets of configuration data is a proprietary protocol through which the controller instance and the first and second local controllers communicate, wherein the second protocol used to distribute the third configuration data set is an open source protocol through which the TOR switch and the second local controller communicate.

19. The non-transitory machine readable medium of claim 12, wherein the controller instance executes on the same second computer and is executed by at least one same set of processing units as the second local controller.

20. The non-transitory machine readable medium of claim 12, wherein the controller instance is one of a plurality of controller instances that form a central control plane cluster that computes configuration data for managed forwarding elements to implement logical networks for a plurality of tenants of a hosting system.

* * * * *